United States Patent [19]

Eklof et al.

[11] Patent Number: 4,687,368
[45] Date of Patent: Aug. 18, 1987

[54] THREAD STRUCTURE FOR PERCUSSION ROCK DRILLING

[75] Inventors: Åke T. Eklof, Skarholmen; Harry A. I. Wiredal, Sandviken, both of Sweden

[73] Assignee: Santrade Limited, Lucerne, Switzerland

[21] Appl. No.: 847,707

[22] Filed: Apr. 3, 1986

[30] Foreign Application Priority Data

Apr. 4, 1985 [SE] Sweden ............................ 8501699

[51] Int. Cl.$^4$ .............................................. F16B 7/00
[52] U.S. Cl. ..................................... 403/343; 403/307; 285/334
[58] Field of Search ................... 299/69, 94; 403/343, 403/307, 299; 175/320; 285/333, 334

[56] References Cited

U.S. PATENT DOCUMENTS

| | | | |
|---|---|---|---|
| Re. 27,284 | 2/1972 | Hjalsten et al. | 403/343 |
| 1,932,427 | 10/1933 | Stone | 285/334 |
| 3,537,738 | 11/1970 | Fischer et al. | 403/343 |
| 3,645,570 | 2/1972 | Johansson et al. | 403/307 |
| 3,666,022 | 5/1972 | Bailey et al. | 175/320 X |
| 3,717,368 | 2/1973 | Czarnecki et al. | 403/343 |
| 4,040,756 | 8/1977 | Donegan | 403/343 X |
| 4,295,751 | 10/1981 | Holmberg | 403/343 X |
| 4,332,502 | 6/1982 | Wormald et al. | 403/343 |
| 4,540,200 | 9/1985 | Larsson | 175/320 X |

FOREIGN PATENT DOCUMENTS

| | | | |
|---|---|---|---|
| 2050703 | 6/1971 | Fed. Rep. of Germany | 403/343 |
| 2800887 | 7/1978 | Fed. Rep. of Germany | 175/320 |

*Primary Examiner*—Stephen J. Novosad
*Assistant Examiner*—David J. Bagnell
*Attorney, Agent, or Firm*—Burns, Doane, Swecker & Mathis

[57] ABSTRACT

A thread structure for interconnecting two elements in a percussion drill string comprising an interior cylindrical thread and an exterior cylindrical thread. The threads have abutting flanks which are straight along their abutting contact portions. The clearance (a) between the bottom portion of the exterior thread and the crest portion of the interior thread is large enough to ensure that contact does not arise at said clearance when the threads are worn.

7 Claims, 6 Drawing Figures

THREAD STRUCTURE FOR PERCUSSION ROCK DRILLING

BACKGROUND OF THE INVENTION

This invention relates to a thread structure for interconnecting two elements in a percussion drill string comprising an interior cylindrical thread and an exterior cylindrical thread, said threads having abutting flanks which are straight along their abutting contact portions.

A thread structure of this type is described in U.S. Pat. No. 3,645,570. In such a thread structure friction martensite is formed at the contact surfaces resulting in so-called pittings. This is particularly the case when compressed air is used as flushing medium which leads to a comparatively poor cooling of the contact surfaces, and when the contact surfaces are carburized. When these so-called pittings do arise on the flanks of the threads they are comparatively harmless except in the bottom portion of the exterior thread, however, where the stress concentration is high, and a surface defect does rapidly lead to fatigue failure of the drill element.

The object of the present invention is to provide a thread structure of the above-described type in which it is ensured that contact will not arise between the crest portion of the interior thread and the bottom portion of the exterior thread when the threads are worn.

Specifically, this invention seeks to provide an improved coupling thread on a drill rod which is exteriorly threaded at its one end and interiorly threaded at its other end, where the interior thread is provided in a sleeve-shaped portion of the drill rod. A drill rod of this type is described in U.S. Pat. No. 3,537,738.

Other objects of the invention are to provide a drill rod of the type described in U.S. Pat. No. 3,537,738 having the same bending resistance throughout its length and to ensure that flushing medium can reach the threads to flow therebetween for purposes of decreasing the wear of the threads.

THE DRAWINGS

The invention is described in detail in the following with reference to the accompanying drawings in which one embodiment is shown by way of example. It is to be understood that this embodiment is only illustrative of the invention and that various modifications may be made within the scope of the claims.

In the drawings, FIG. 1 shows a sectional side view of the one end of a drill rod according to the invention.

DETAILED DESCRIPTION OF A PREFERRED EMBODIMENT OF THE INVENTION

Figure 1:
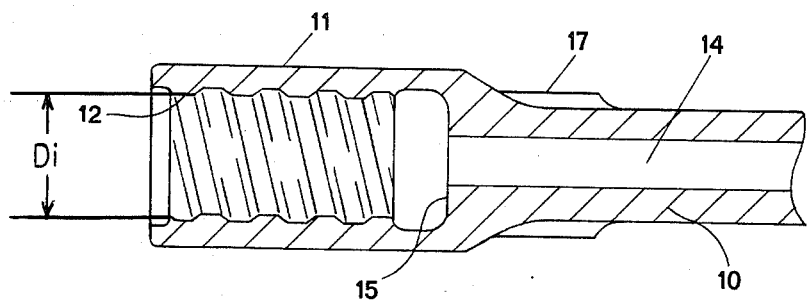
Figure 2:
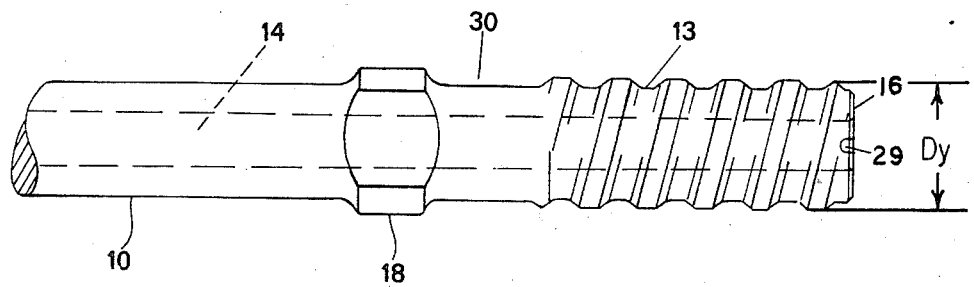
FIG. 2 shows a side view of the other end of the drill rod in FIG. 1.
Figure 3:
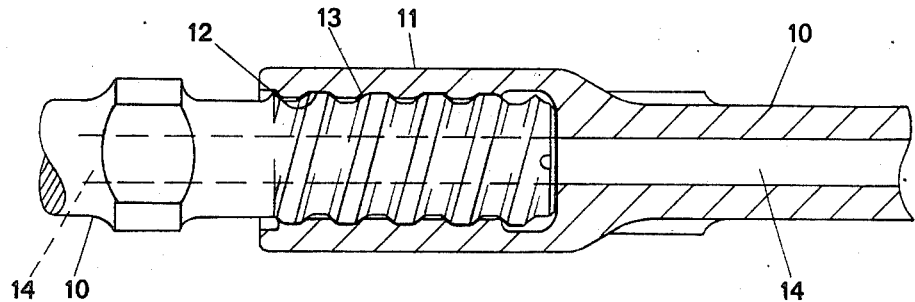
FIG. 3 shows two drill rods of the type shown in FIGS. 1 2 mutually interconnected.
Figure 4:
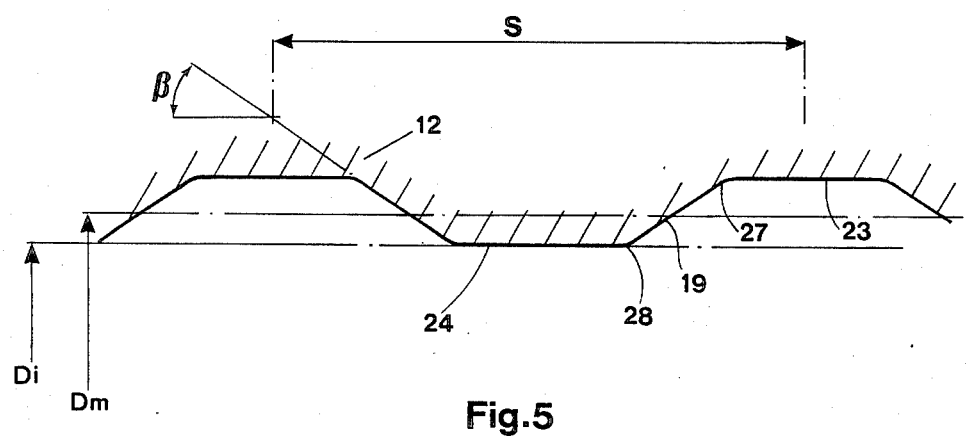
FIG. 4 shows an interior thread in a drill element according to the invention.
Figure 5:
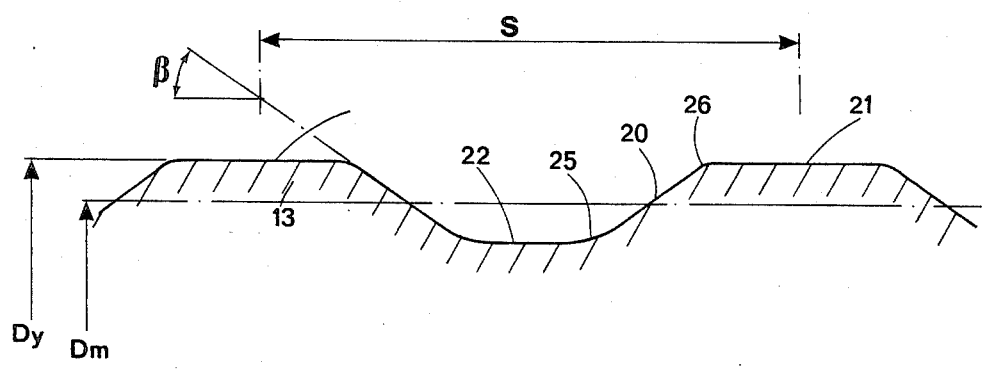
FIG. 5 shows an exterior thread in a drill element according to the invention.
Figure 6:
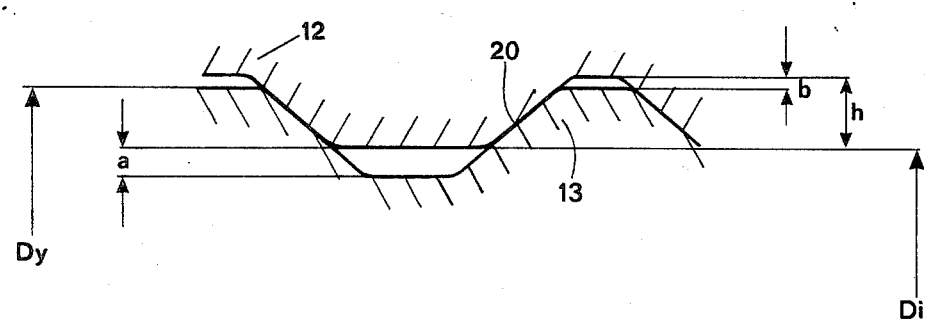
FIG. 6 shows on an enlarged scale a portion of the coupling in FIG. 3.

The drill rod 10 shown in FIGS. 1 and 2 is at its one end provided with a sleeve-shaped portion 11, in which is formed an interior thread 12. At its other end the drill rod 10 is provided with an exterior thread 13. Further, the drill rod 10 has a flushing channel 14 traversing longitudinally therethrough, through which flushing medium, such as compressed air or water, is conducted. The bottom of the sleeve-shaped portion 11 forms an annular abutting surface 15 which is adapted to rest against a corresponding annular abutting surface 16 at the exteriorly threaded end of another drill rod when two drill rods 10 are screwed to each other.

In the illustrated embodiment the drill rod 10 is circular in cross section and is provided with wrench grips 17, 18 at it ends to make possible holding of the drill rods during connection and disconnection thereof.

The interior thread 12 has in longitudinal section a straight flank portion 19 and the exterior thread 13 has a corresponding straight flank portion 20. The threads 12, 13 have, in profile, straight crest and bottom portions denoted by 21 and 22, respectively, for the exterior thread and by 23 and 24, respectively, for the interior thread. The straight crest and bottom portions turn into the straight flank portions 19, 20 via curved portions 25, 26 on the exterior thread and curved portions 27, 28 on the interior thread.

In conventional manner the threads 12, 13 are designed in such a way that contact does arise solely between the straight flank portions 19, 20 when the threads are screwed together and thus not between the curved portions or between crest and bottom portions. Thus, abutment is avoided between portions which are only slightly inclined relative to the drill axis; said abutment might cause the threads to become wedgingly interconnected.

As above-mentioned the purpose of the invention is to ensure that contact does not arise between the crest portion 24 of the interior thread 12 and the bottom portion 22 of the exterior thread when the threads are worn. Due to the asymmetrical wear of the thread profile upon wear of the threads the clearance a between the crest portion 24 and the bottom portion 22 tends to become smaller and smaller at the one side; more precisely at the side nearest to the abutting flank portions 19, 20.

In a thread structure of this type it is desired to have the interspace between the threads as small as possible in order to counteract penetration of drill dust into the thread coupling. Controversially thereto it has been found that the life of the drill element is considerably lengthened if the clearance a is highly enlarged. By this it is ensured that contact will not even arise at the portions 22, 24 when the threads are highly worn. In this case, of course, contact does arise at the portions 21, 23 since the clearance b between the bottom portion 23 of the interior thread and the crest portion 21 of the exterior thread is of conventional size. Such contact resulting in so-called pittings, however, does very seldom cause fatigue failure. The reason therefore is that the portion having the interior thread 12 has considerably higher bending resistance than the portion having the exterior thread 13, which leads to lower bending stresses in the first-mentioned portion. It has been found that the clearance a should be larger than 1% of the outer diameter Dy of the exterior thread 13 and also that the clearance a is at least four times the clearance b in order to ensure that contact does not arise between the portions 22, 24. In the illustrated embodiment the interior thread 12 has a height h smaller than 5% of the inner diameter Di of the interior thread 12. In a preferred embodiment the thread 12 has a height h smaller than 4.5% of the inner diameter Di for inner diameters smaller than 55 mm.

In a manner known per se the threads have one entrance and the pitch angle α of the threads is between 5.5° and 8°. The pitch angle α is calculated from the formula $$\tan \alpha = s/D_m \cdot \pi,$$

where s = the pitch, and
$D_m$ = the effective or mean diameter.

The somewhat decreased pitch angle, when compared to the thread structure in U.S. Pat. No. 3,645,570, is due to the fact that the pitch angle in the present invention is adapted to hydraulically operated rock drilling machines, whereas the pitch angle in the thread structure in U.S. Pat. No. 3,645,570 is adapted to pneumatically operated rock drilling machines. Due to the nature of the shock wave pneumatic rock drilling machines do tighten the thread connection harder than hydraulic rock drilling machines. Since the uncoupling torque increases if the pitch angle is decreased a comparatively small pitch angle is chosen in order to ensure that the thread connection is tightened hard enough during drilling by hydraulic rock drilling machines. In a preferred embodiment it has been found that the pitch angle α should decrease 0.4°–0.8° when the diameter of the threads 12, 13 is increased 10 mm, in which case the pitch angle α is in the order of 7.2° for an interior thread 12 having an outer diameter of 38 mm.

In a manner known per se the inclination angle β of the flank portions 19, 20 relative to the longitudinal axis of the percussion drill string is 25°–40°, with preference for values in the order of 35°. As above-mentioned abutment does arise solely at the flank portions 19, 20. Therefore, the flanks opposed to the flank portions 19, 20 as well as the adjoining curved portions and the crest and bottom portions can be designed arbitrarily within rather broad limits. However, it has been found suitable to have the two opposed flanks of the threads substantially symmetrical with respect to the inclination of the flanks. Further, it has been found suitable to have the crest ant bottom portions of the threads straight and substantially parallel to the longitudinal axis of the drill string. However, the crest and bottom portions can be designed in other ways, for instance concave, in which case the clearance a is measured at the point where the distance is smallest between the crest and bottom portions and the height h is the largest height of the thread.

Below are in tabular form values which have been found suitable for the clearance a, the height h of the interior thread and the pitch angle α for different values on the inner diameter Di of the interior thread and the outer diameter Dy of the exterior thread.

| Di (mm) | Dy (mm) | a (mm) | h (mm) | α |
| --- | --- | --- | --- | --- |
| 35.20 | 38.20 | 0.45 | 1.60 | 7.17° |
| 40.60 | 44.20 | 0.55 | 1.90 | 6.72° |
| 46.60 | 50.80 | 0.65 | 2.20 | 6.31° |
| 54.70 | 57.80 | 0.70 | 2.65 | 5.97° |

Since the clearance b has a constant value, 0.1 mm, the ratio a:b is in the range of 4.5 to 7 for the examplified threads.

As apparent from FIG. 2 a groove 29 is provided in the abutting surface 16. The groove 29 extends entirely across the abutting surface 16 and communicates with the flushing channel 14, thereby ensuring that flushing medium is supplied to the threads 12, 13 for flushing and cooling thereof. Alternatively, the groove 29 can be made in the abutting surface 15.

As above-said the invention also seeks to design the drill rod 10 in such a way that it has the same bending resistance throughout its length so that the percentage of rod breakage as the final fault is decreased. For that purpose the reduced-diameter portion 30 of the drill rod 10 immediately adjacent to the exterior thread 13 has the same diameter as the remainder of the drill rod.

Although being described in connection to a drill rod being externally threaded at its one end and interiorly threaded at its other end it is to be understood that the thread structure can be used in any type of drill elements in a percussion drill string, such as a drill rod externally threaded at both ends, a coupling sleeve for inter-connecting two such drill rods and a drill bit adapted to be connected to such a drill rod.

We claim:

1. A percussion drill string comprising a first element having an interior cylindrical thread and a second element having an exterior cylindrical thread, said threads including mutually abutting flanks which are straight along their abutting contact portions as viewed in longitudinal section, a first clearance provided between a bottom portion of the exterior thread and a crest portion of the interior thread which is at least four times as large as a second clearance between a bottom portion of the interior thread and a crest portion of the exterior thread, said first clearance being larger than one percent of the outer diameter of the exterior thread as measured from crest-to-crest.

2. A percussion drill string according to claim 1, wherein said second clearance is 0.1 mm.

3. A percussion drill string according to claim 1, wherein the interior thread has a height smaller than 5 percent of the inner diameter of the interior thread.

4. A percussion drill string according to claim 1, wherein the interior thread has a height smaller than 4.5 percent of the inner diameter of the interior thread for inner diameters smaller than 55 mm.

5. A percussion drill string according to claim 1, wherein the abutting blanks are inclined 25 to 40 degrees to the longitudinal axis of the drill string.

6. A percussion drill string according to claim 4, wherein the threads have one entrance and the pitch angle of the threads is 5.5 to 8 degrees, wherein the pitch angle is decreased 0.4 to 0.8 degrees upon an increase of 10 mm of the diameter of the threads, and wherein the pitch angle is on the order of 7.2 degrees for an interior thread having an outer diameter of 38 mm.

7. A percussion drill string according to claim 1, wherein each said element comprises said exterior thread at one end and said interior thread at another end, a flushing channel extending centrally through said element, said interior thread formed in a sleeve portion of said element disposed at said other end, the bottom of said sleeve portion forming an annular abutting surface which contacts a corresponding annular abutting surface of said one end of an adjacent element of said drill string, a transverse flushing groove formed in one of said abutting surfaces and communicating said flushing channel with said threads.

* * * * *